Jan. 2, 1940.   D. W. ADAMS ET AL   2,185,878
METHOD OF ROASTING COFFEE AND APPARATUS THEREFOR
Filed May 26, 1936   6 Sheets-Sheet 2
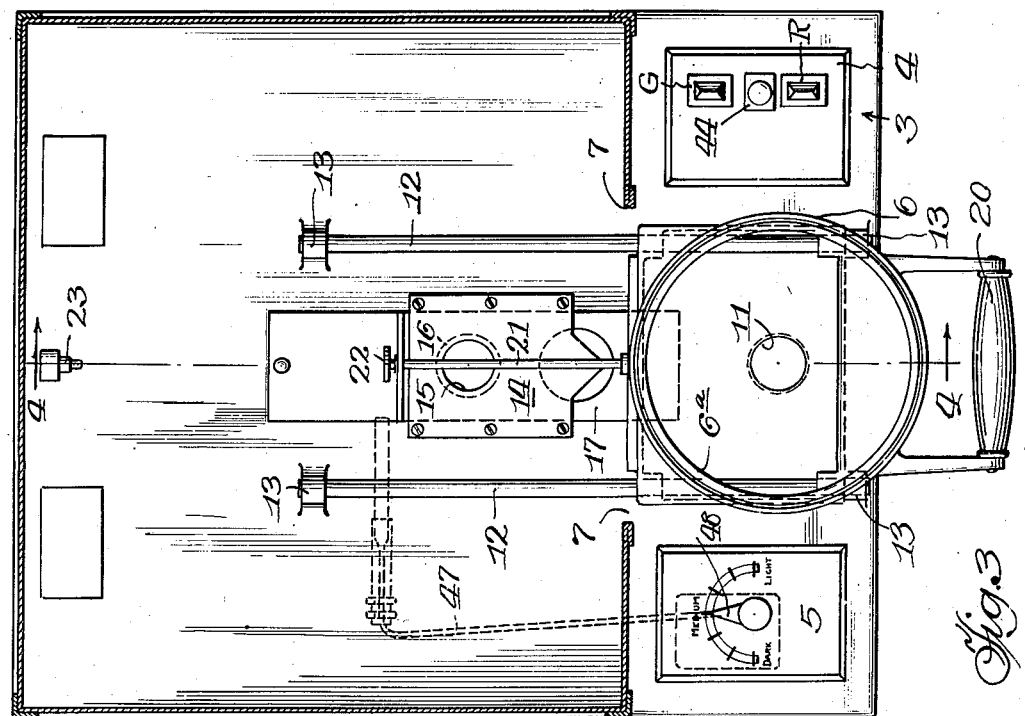
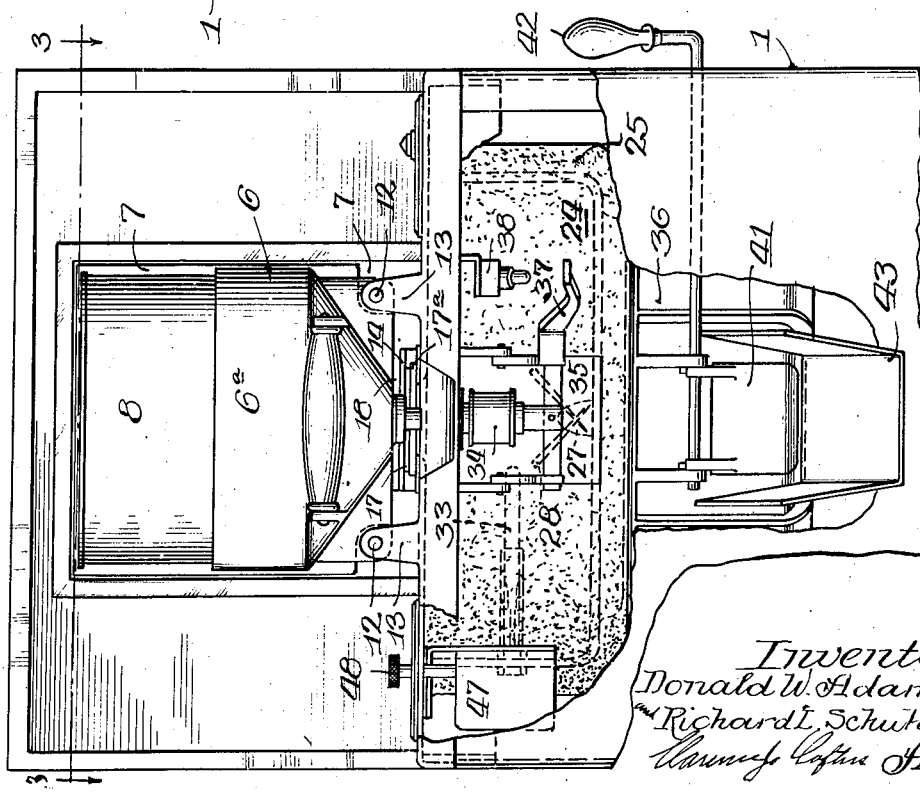
Inventors,
Donald W. Adams.
Richard L. Schuhmann
Clarence Cotton Atty.

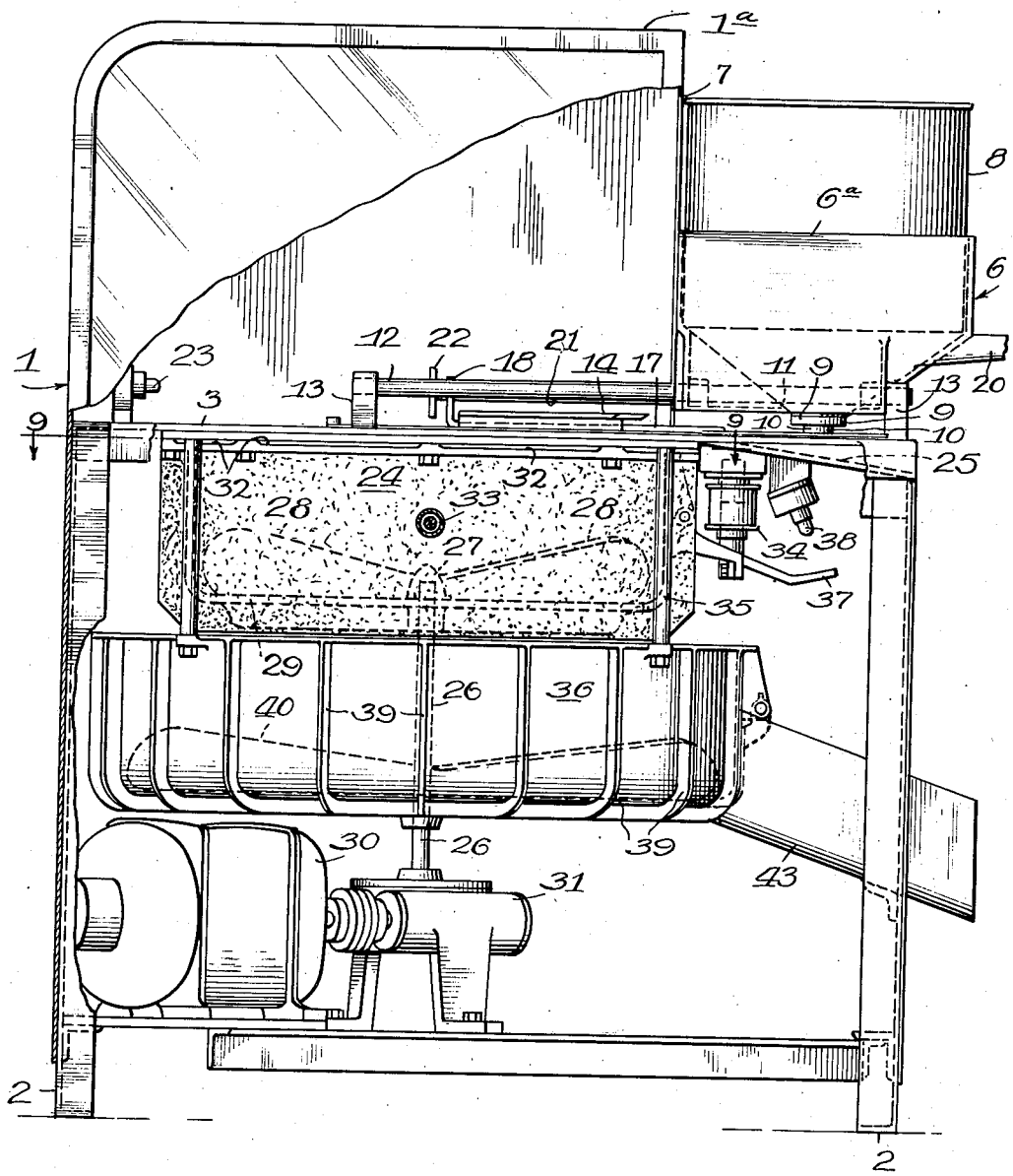

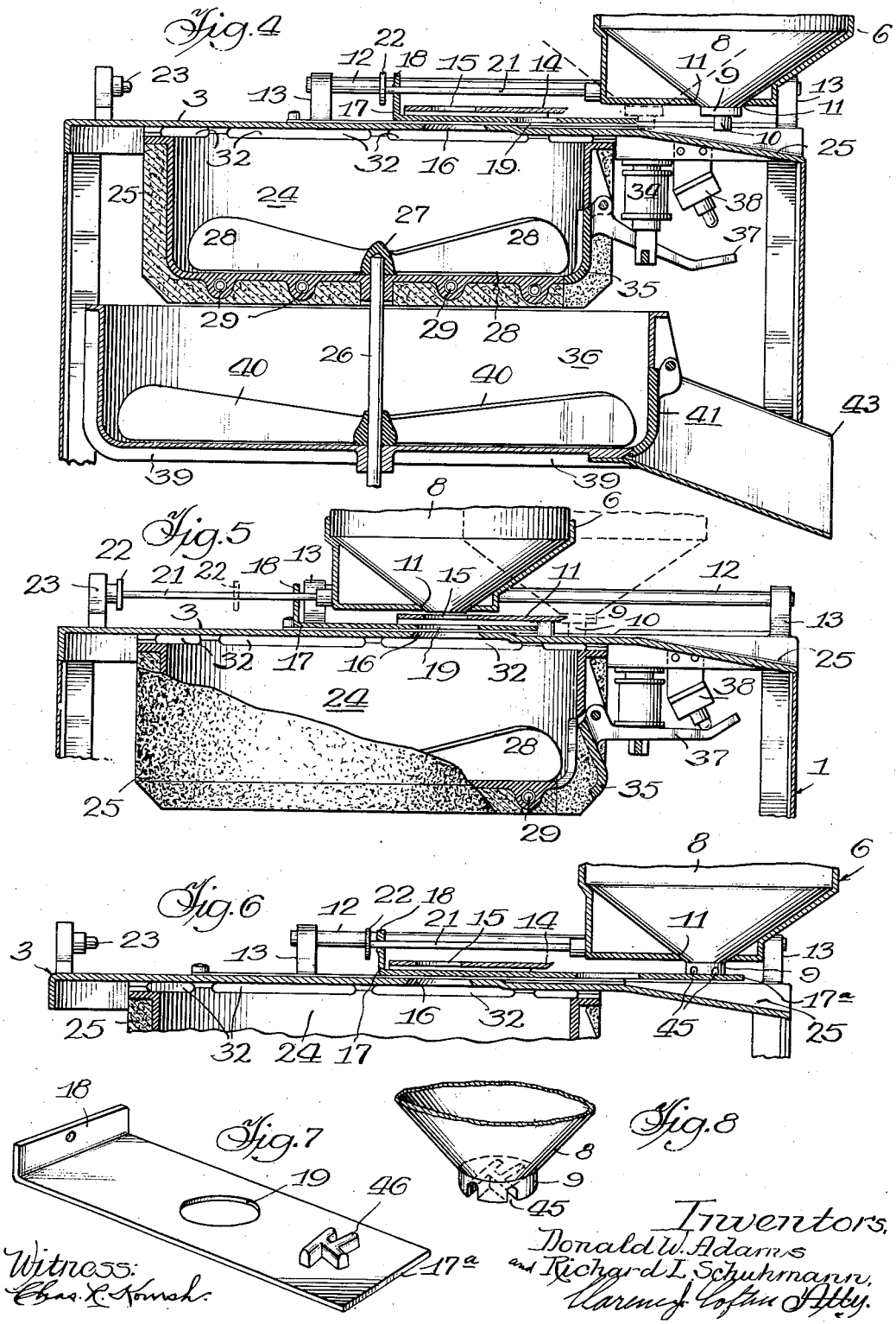

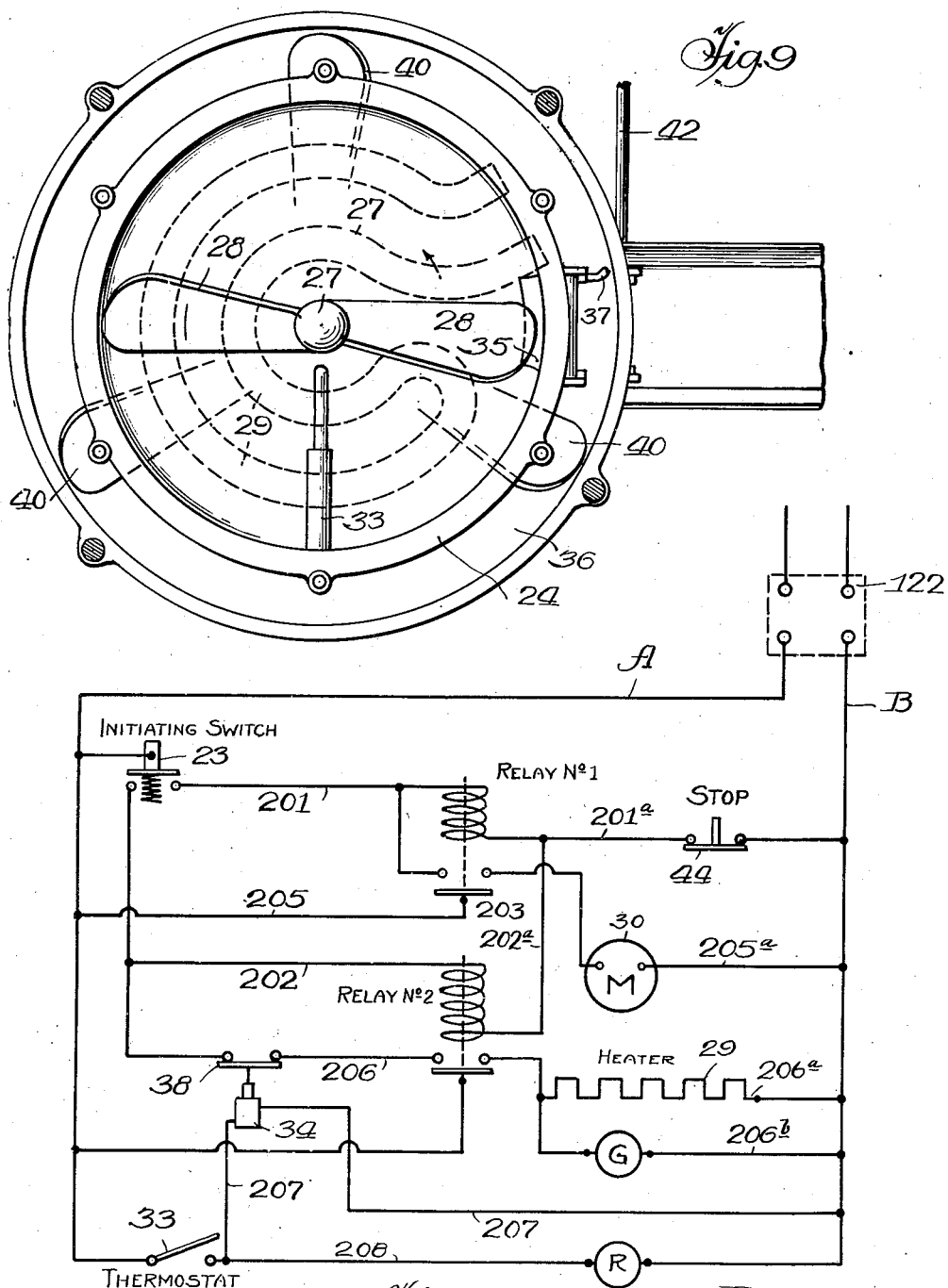

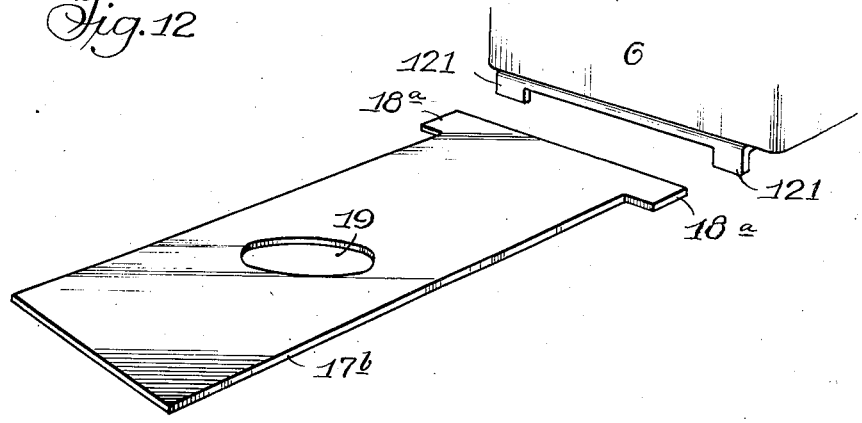
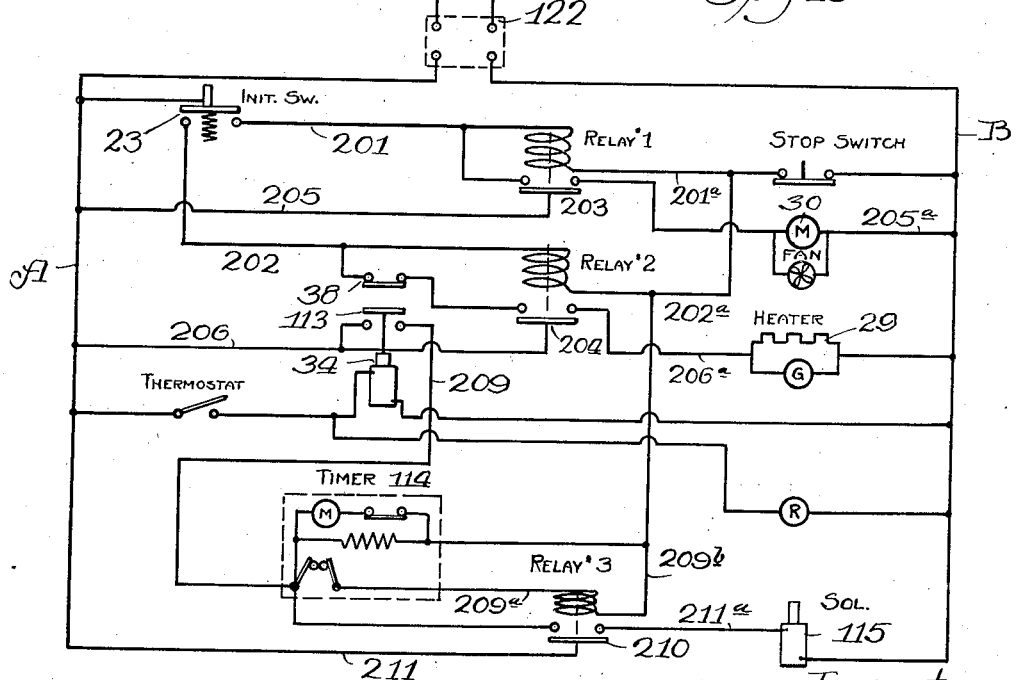

Patented Jan. 2, 1940

2,185,878

UNITED STATES PATENT OFFICE 2,185,878

METHOD OF ROASTING COFFEE AND APPARATUS THEREFOR

Donald W. Adams and Richard L. Schuhmann, Louisville, Ky., assignors, by mesne assignments, to Coffee Electrost Corporation, a corporation of Delaware Application May 26, 1936, Serial No. 81,890

20 Claims. (Cl. 34—23)

Our invention relates to a method and apparatus for roasting coffee.

Two prior methods have been used in roasting coffee. One might be termed the "sight" method and the other the "time" method. Both have proven unsatisfactory.

With respect to the "sight" method it is quite impractical for the average grocer to turn out a batch uniformly roasted throughout to a predetermined standard. Particularly is this true of successive batches or successive roasts for the shade or color of the coffee bean as it is roasted under different conditions, for example, light, varies to such an extent that a particular shade under one condition might represent in spots a proper roast while at other times when observed by the same operator it might well be an "over" and/or "under" roast.

The "time" method is likewise impractical to carry out any predetermined uniformity as to each roast and particularly is this true as to successive roasts. For example, when the apparatus is set for a predetermined time limit and the coffee is of a predetermined moisture content, under certain conditions a satisfactory result may be obtained for portions of that particular batch but with the next successive batch if the moisture contents varies, as it generally does, a mixed batch of "over" or "under" roasted coffee may result.

It is, therefore, an object of our invention to provide a method and roaster which overcomes these objections and will insure at all times, even when directed by unskilled hands, a predetermined uniformity of roasts throughout each successive batch irrespective of varying conditions.

Furthermore, it is highly desirable as soon as the coffee has reached the correct roasting temperature that roasting should be immediately checked or quenched otherwise scorching will occur and the flavor of the coffee greatly impaired or completely spoiled, therefore with commercial batch roasting in use at the present time it is necessary to spray the coffee with cold water to arrest or check roasting. When a coffee bean is roasted and arrives at a reasonably high temperature the oils therein contained are driven to the surface of the bean by the absorbed heat. When in that condition and the roasting is arrested or quenched by being subjected to cold water a considerable amount of the free oils which afford flavor and aroma volatilize and are carried away with the steam, resulting in loss of flavor and aroma and increase in shrinkage. Moreover, the pores of the bean under heat are opened and to chill them by an application of cold water results in an immediate contraction which prevents the exuded oils re-entering the bean. It is, therefore, a further object of our invention to provide a method and apparatus which overcome these objections by dry quenching and gradually dry cooling the roast.

Our air or dry quench method, therefore, provides a roast of superior flavor as it prevents the escape of an excessive amount of oil and, for the same reason, a coffee bean that is softer and easier to grind.

A further object is to provide a method and apparatus whereby each successive batch may be roasted as needed to a predetermined standard of perfection without any attention on the part of the operator, except loading of the apparatus with green coffee, otherwise the operation of the machine is entirely automatic.

A further object of our invention is to provide an apparatus which may be set for a predetermined standard and automatically controlled by the heat absorption temperature of the coffee bean. By experimentation we have found that under normal conditions the best results are obtained by gradually raising the absorbed temperature of the coffee bean to about 365° F. for a medium roast. Our roasting device is automatically controlled by a heat sensitive device or suitable thermostat whereby when the temperature of the green coffee bean is gradually brought to a predetermined absorbed temperature, the application of heat is immediately discontinued by automatically breaking the heating circuit and the coffee is automatically immediately discharged from the roasting device, to avoid over roasting, into a dry quenching and gradual dry cooling chamber.

A further object of our invention is to provide a method and apparatus for roasting coffee whereby the coffee beans are roasted uniformly throughout the batch while the batch throughout is rapidly and uniformly concomitantly moved in circular, gyratory paths or streams throughout the roasting chamber thereby separating, rolling, spinning and swirling the individual beans in these various paths or streams so that all the parts of the batch and beans are subjected to predetermined uniform roasting conditions.

A further object is to provide a coffee roaster having in combination a roasting compartment with a relatively large dry quenching and gradual dry cooling compartment immediately adjacent thereto in which quenching and cooling compartment the coffee while being cooled is likewise concomitantly and rapidly moved in circular, gyratory paths uniformly throughout the cooler so that the roasted coffee deposited therein from the roaster is given a dry quench uniformly throughout. By quenching we mean to suddenly arrest the roast by dissipating the absorbed heat but without a rapid cooling thereof whereby to bring the oils in the bean below the vaporization point without the introduction of a severe chilling medium.

While it is difficult to explain, we find from experience that the form and arrangement of the impeller in the roasting chamber and the coaction of the roasting chamber and the impeller play an important part in the results obtained and that the relatively high speed of the impeller is also equally important.

A further object of our invention is to provide a roaster which is adapted for use in all localities. This is important for the degree of roasting which the trade demands or prefers varies in different localities. Our method and apparatus are sufficiently flexible to meet such requirements and also to meet the requirements due to varying climatic and atmospheric conditions.

A further object of our invention is to provide a roaster, the operation of which can only be initiated by loading the apparatus with a predetermined container which forms a part of the combination and cooperates in the operation.

From experimentation we find that the best results are obtained by charging the machine with a batch of green coffee in proper proportion to the capacity of the roasting chamber, its impeller and the speed of operation, therefore, it is an object of our invention to provide a coffee roaster so designed that containers having a capacity of predetermined limit can only be used with our roaster.

A further object of our invention is to provide means for automatically indicating to the operator when a roast is on and when the apparatus is ready for another load.

A further object of our invention is to provide a novel form of impeller for the coffee roasting chamber and/or for the coffee cooling chamber.

A further object of our invention is to provide a roaster which is adapted to separate the free chaff from the beans and to carry the chaff away from the finished roasted product.

A further object of our invention is to provide an electrically operable coffee roaster for use in a grocery store or the like in which green coffee may be uniformly roasted to a predetermined standard automatically and without attention from the operator during the roasting operation.

The present coffee roasters are not adapted for use in a grocery store for various reasons. The grocery roasters require the constant attention of an operator who must be an expert to determine by the color of the bean whether or not the coffee is properly roasted. Our device is so simplified that it occupies a relatively small space, is portable and being automatic does not require the attention of an expert and is therefore suitable for use by ordinary unskilled hands in a grocery store.

It has long been recognized that it is preferable to roast coffee by electrical means as a superior flavor is obtained because of the radiant heat. However, heretofore electrical heating means for the roasting chamber could not be successfully used, due to the fact the the coffee was not forcibly uniformly and rapidly agitated throughout the batch while the batch was gradually raised to the desired predetermined temperature so that it was uniformly heated throughout. Our novel impellers have eliminated this difficulty and therefore by means of our apparatus and method it is now entirely practical to roast coffee electrically with the inherent advantages thereof.

A further object is to provide a construction of maximum efficiency, economy, ease of assembly, operation, repair and maintenance.

It is a further object of our invention to provide a roaster whose operation normally can only be initiated by first loading the mechanism with a predetermined novel container so that the trade may be protected against spurious or inferior green coffee being fed to our apparatus.

The invention further resides in the combination, arrangement and construction of parts illustrated in the accompanying drawings in which we have shown preferred forms of our invention but the constructions there shown are to be understood as illustrative only and not as defining the limits of our invention and that the invention is susceptible to modification and change and contemplates other forms and arrangements of parts, features and constructions without departing from the spirit of the invention as defined in the appended claims.

In the drawings:

Fig. 1 is a side elevational view partly in vertical cross-section of a coffee roaster embodying one form of our invention.

Fig. 2 is a fragmentary view in front elevation with parts broken away to more clearly disclose the novel construction.

Fig. 3 is a view in horizontal cross section taken on the line 3—3 of Fig. 2.

Fig. 4 is a vertical cross-sectional view of the upper part of the device takn on the line 4—4 of Fig. 3 and with the door of the roasting chamber closed and the hopper in loading position. This view also shows one form of the cooperating unlocking means, container opening means and means for initiating the operation of the roaster.

Fig. 5 is a fragmentary vertical cross-sectional view taken in the same plane as Fig. 4 but showing the hopper moved into position for discharging the contents of the container into the roasting chamber.

Fig. 6 is a fragmentary view of the device primarily in section showing the hopper with an alternate construction of cooperating unlocking means, container opener means and means for initiating the operation of the roaster.

Figs. 7 and 8 are perspective views of the alternate form of loading hopper and unlocking and initiating mechanism shown in Fig. 6.

Fig. 9 is a horizontal cross-sectional view taken on the line 9—9 of Fig. 1.

Fig. 10 shows a simplified wiring diagram of the electrical operating circuits and connections therefor.

Fig. 12 is a perspective of another modified form of the initiating and unlocking mechanism.

Fig. 13 shows a simplified wiring diagram of the electrical operating circuits and connections therefor for the modified form shown in Fig. 11.

Figure 11:
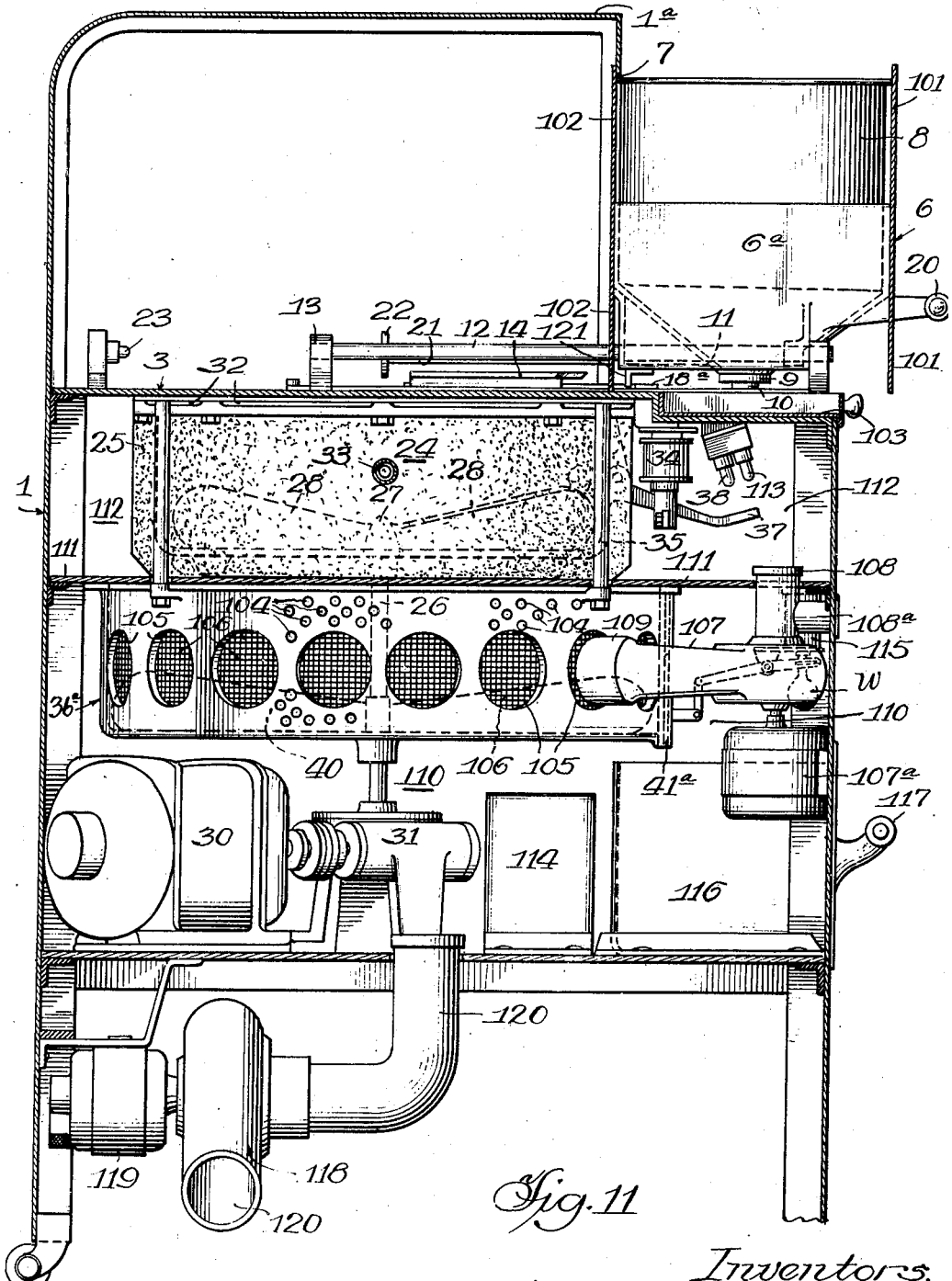
Fig. 11 shows a modified form of roaster in a view similar to Fig. 1.

Referring now to the accompanying drawings in detail in which we have illustrated certain embodiments of our invention. Figs. 1 to 10 illustrate a novel roaster shown as comprising a cabinet 1 of any desired material such as suitable metal having suitable legs 2 provided with rollers so that the apparatus can be readily moved.

The cabinet is preferably insulated by lining the inner walls with suitable materials, such as asbestos. In the form shown it is rectangular in shape provided at its upper end with an offset loading housing or hood 1a preferably formed integrally with the rear wall of the cabinet. Between the hood and the remainder of the cabinet is a partition 3 co-extensive with the cross-section of the body of the cabinet. On this partition there are mounted instrument panels 4 and 5 and charging carriage 6, the panels being positioned outside the hood 1a. The forward side of the hood is provided with a central rectangular opening 7 to permit the loading carriage and the container carried thereby to pass in and out of the hood. The charging carriage has a loading hopper 6a of any suitable shape designed to receive in loading position a green coffee container 8. This container may be of any shape desired so long as the shape in co-operation with the mechanism hereafter described initiates the loading and roasting operation. In the particular form shown a container is placed in the hopper in an inverted position and when thus placed affords a funnel shaped discharge end which discharge end has a fixed sealing cap 9 provided with an integral boss 10 extending downwardly therefrom. The cap and boss of the container extend through an opening 11 in the bottom of the carriage hopper. The carriage hopper frame is provided with aligned openings on opposite sides. By means of these openings it is slidably mounted on spaced parallel rails 12 which extend from the front of the cabinet backwardly toward the rear end thereof through the opening 7 in the hood 1a. These rails are supported above and on the partition 3 by means of suitable lugs 13 which may be fixed to or formed integrally with the partition 3. In the form shown they are formed integrally therewith.

Positioned between the rails 12 and preferably within the hood 1a is a stationary container opener or blade 14 which blade is secured to the partition 3 and spaced therefrom. This opener or cutting blade is provided with a circular discharge opening 15 in registration with an intake opening 16 in the partition 3 leading to the adjacent roasting chamber hereafter described. Suitably positioned between blade 14 and the partition 3 is a flat unlocking and operating initiating means 17 which is provided with an upstanding flange 18 and having a discharge opening 19 designed to be brought into registration with the discharge opening 15 in the blade and intake opening 16 in the partition 3. The carriage is provided on its front side with a handle 20 for manually moving the carriage forward into the hood for loading the roasting chamber and withdrawing it for removing the empty container. The opposite side of the carriage frame is provided with a rearwardly extending contact plunger 21 slidably mounted in an opening in the flange 18 of the member 17. The free end of this plunger carries a contact disc 22. This disc is adapted when the carriage is moved into the hood to contact and press against a push spring release switch 23 mounted in the rear part of the hood which when pressed sets up circuits hereinafter described permitting the current to flow to the motor and the roasting heating elements for heating the roasting chamber 24.

The roasting chamber as shown is cylindrical in form and relatively shallow and is rigidly fixed by any suitable means adjacent the partition 3 which forms a closure therefor. The roasting chamber is constructed of suitable metal and provided with a substantial covering of suitable heat insulating material 25. The cubic content of the roasting chamber is relatively greater than the green coffee receptacle so that each charge or batch from the receptacle can be properly handled and treated in the roasting compartment to obtain the most efficacious results.

Extending through a central opening in the bottom of the roasting compartment is a power driven rotatable shaft 26. Fixed to this shaft and adjacent the bottom of the roasting compartment is a metal impeller which impeller comprises a central dome shaped stem portion 27 and a plurality of impeller blades 28 formed integrally with the stem 27, the diameter of the perimeter of which impeller is slightly less than the diameter of the roasting compartment.

These blades on their lower edges extend outwardly from the dome parallel with an immediately adjacent to the bottom surface of the roasting compartment while their upper edges start from a point below the apex of the dome and extend outwardly and gradually upwardly to a point substantially above the apex of the dome 27, thence downwardly and outwardly, as best seen in Fig. 4, while their driving surface area extends backwardly and upwardly from the direction of normal travel, as best shown in Fig. 9.

The shaft 26 for driving the impeller in the roasting chamber is driven by suitable motive power, in the form shown, an electric motor 30 which is mounted in the lower portion of the cabinet 1, the armature of which motor is operatively connected to this shaft through a suitable reduction gear 31.

The roasting chamber is preferably made of aluminum as it has a high heat conductivity and will not become rusted by the vapors escaping from the coffee. The roasting chamber is provided with electrical heating elements 29 energized by the push spring release switch 23. The impeller is driven at a relatively high speed. In practice we find that the best results are obtained when the impeller of the particular embodiment shown is operating at 44 R. P. M. while gradually raising the heat absorbing temperature in the batch of coffee to about 365° F.

We have found that if the speed of the impeller is much greater than this, too violent currents of air are set up which cool part of the coffee and cause uneven roasting thereof. If the speed is much less the beans are not moved from contact with the hot walls of the roasting chamber fast enough to prevent scorching or too great heat absorption, also resulting in a non-uniform roast.

By the term "impeller" is meant a relatively rapid rotary member operable to effect uniform movement of the coffee in the roaster throughout in devious, circular, swirling or gyratory paths and which concomitantly sieve currents of air uniformly throughout the batch and around the various beans forming the batch.

At the top of the roasting chamber are openings 32 from which fumes are allowed to escape. These fumes may pass away through a flue (not shown) or by other means, such as by a suction fan through a commercial air conditioner. Fresh air also enters the chamber through these openings 32.

Located in the roasting chamber is a thermostat 33 immediately above the dome of the impeller so as to be embedded in the coffee when the usual predetermined batch from the container has been dumped therein and while being uniformly moved during the roasting operation. This instrument is adapted for measuring the absorbed temperature of the coffee bean and when this temperature is gradually built up to reach a predetermined point for the desired roast, it operates the switch which makes an electrical circuit to energize the solenoid 34. The solenoid 34 in turn through proper connections, opens the discharge door 35 of the roasting chamber from which opening the roasted coffee is immediately discharged by the rapidly rotating impeller into a relatively large shallow cylindrical quenching and cooling chamber 36 mounted directly below and adjacent to the roasting chamber. When the solenoid 34 is energized it raises with it the arm 37 which arm contacts switch 38. This switch in turn operates an indicating light R, preferably red, on the instrument panel 4 and also breaks the circuit or circuits to the heating elements and the light G.

Cooling chamber 36 is considerably larger than the roasting chamber so that the coffee will spread out therein over a relatively large area. The cooling chamber may have cooling fins 39 as shown, or other suitable cooling means may be employed. This chamber is provided with an impeller 40 substantially like the impeller in the roasting chamber, except that it is relatively larger. It is also rapidly driven by shaft 26 to quickly quench and gradually and thoroughly cool the roasted coffee.

Both impellers are rotating continuously while the roaster is in operation, whether or not there is coffee in their respective chambers. We have found that the blades on the impellers give the best results when positioned at an angle of 140° to 145° (see Fig. 2) but do not confine ourselves to this arrangement. The impeller in the roasting chamber is preferably two-bladed and the cooling chamber impeller is preferably three-bladed (see Fig. 9).

The blades of the impellers are preferably much higher at their outer ends and taper toward the axis. This construction causes a rotary rolling and turning action of the mass of coffee and provides for an equal distribution of heat and/or cool air to all parts of the coffee and sets up untold streams of forced currents of air throughout the batch of coffee. The impellers also tend to neutralize the action of centrifugal force, which would cause the coffee to be massed in one section of the chamber and become unevenly heated or cooled by continuously moving the coffee toward and away from the center of the chamber. This action of the blades causes not only the rolling and rotary action of the mass of coffee but imparts to it a gyratory, swirling or spraying action. The ends of the impellers are spaced about ⅜" from the sides of their respective chamber to avoid the possibility of some of the beams becoming wedged between the impeller and the chamber sides.

The device operates as follows: The coffee container is placed in the carriage with the cap extending through the opening 11; the carriage is then pushed into the hood by the operator; the boss contacts the member 17 which is moved forward therewith; during this forward movement the container cap is fed to the knife 14 and is sheared off thereby; at this moment the opening 19 of the member 17 is in registration with the openings 15 and 16. Upon the shearing of the cap the member 17 is released from further movement and remains so that the opening 19 therein is in registration with the other openings. The container, therefore, actively cooperates with the loading and operation initiating mechanism of which it becomes a part during this time and actually forms an element of the combination shown. The inward movement of the carriage however, is continued (the coffee being held from discharging from the container by the knife) until the disc 22 on the plunger depresses switch 23 for setting up the motor and heating circuits which latter include the green light G on the instrument panel in a manner to be described later; at this moment the discharge opening of the container 8 is in registration with openings 15, 16 and 19 thus permitting the contents of the container to discharge into the roasting chamber 24. Thereafter the carriage may be withdrawn and placed in position for another load. During the withdrawal of the carriage the disc 22 of the plunger 21 engages the flange 18 on the slidable member 17 moving it forward to close the intake opening 16 in the top of the roaster. The sheared cap from the container is moved forward by the member 17 and is discharged outside the cabinet down the inclined slide 25.

The electrical operating circuits and contacts are shown in diagram in Fig. 10. When the initiating switch 23 is depressed it closes the circuits to relays #1 and #2 through wires 201, 201a and 202 and 202a, permitting current to flow therethrough from power supply lines A to power supply line B. The relays become energized to close contacts 203 and 204 respectively whereby to start up the motor and the heater and green light (the last two being in parallel) through wires 205, 205a and 206, 206a, 206b. When the absorbed heat of the coffee reaches the predetermined temperature, the thermostat 33 operates to close the circuit to the solenoid 34 and red light R, through wires 207 and 208 which are in parallel. The solenoid operates switch 38 which opens the circuit to wire 206 de-energizing relay #2 and opening the circuit to the heater and green light. There is also provided fuse or circuit breaker 122 which is designed to blow out the fuse (not shown) in the roaster rather than in the building in which it is located.

After the thermostat cools a few degrees it opens the solenoid 34 which is lowered shutting door 35 which is weighted and also opens the circuit to light R. This does not close the circuit to the heater and green light which may be started only by the initiating switch through relay #2. No lights are on now, which means the roaster is ready for another load. The motor is still operating the impellers at this time but the rest of the electrical apparatus is "off". The motor is manually turned off by the stop switch 44 on the instrument panel. This switch may also be used to open the circuit to the heating elements and green light if desired.

When desired the coffee may be removed from the cooling chamber by the operator moving handle 42 which opens door 41 in the chamber (see Fig. 2). The impeller 40 sweeps the coffee out the door and from where it travels by gravity down the chute 43 to a container (not shown).

In Figs. 6, 7 and 8 is shown a modified loading and operation initiating and locking mechanism. Instead of a boss on the cap 9 of the green coffee container 8, shown in Figs. 1–5 there is a pre-determined female key member 45 in the top of the cap. The member 17a is longer than the member 17 so that it extends under the opening 11 in the carriage and has on its top a predetermined male key member 46 adapted to receive the female key member 45. When the container is so positioned the male member 46 will receive the female member 45, the container becomes locked to the member 17a and will move it when it and the carriage are moved, to open the roasting chamber as described above.

We have found that coffee is roasted so as to suit the taste of the majority of people when it attains an absorbed temperature of 365° F. The thermostat, however, may be regulated to operate within a range so that any variation of color of roast practical to commercial roasting may be predetermined and attained. We have found that satisfactory results have been attained between 335° F. and 385° F. (The heaters are designed to reach a temperature of 750° F. at which time the air in the roaster attains a temperature of 425° F.–450° F.) This regulation is accomplished by thermostat adjusting means 47 which is manipulated by handle 48 on the instrument panel 5. The coffee may be roasted either "light", "medium" or "dark" by this means. The device is also adaptable for variations in atmospheric pressure. This latter adjustment is preferably made at the factory before the machine is shipped to regions where the atmospheric pressure is considerably lighter or lower than that where the machine is built. The temperatures given above are for sea level atmospheric pressure.

In the modified construction shown in Fig. 11 the loading hopper 6a of the charging carriage 6 is provided with front and back flanges 101 and 102 which are designed, when the carriage is drawn fully forward or inserted fully within the hood, to form a continuation of the front of the hood whereby to close it completely. Instead of the inclined slide 25 down which the severed caps are to slide there is provided a tray 103 for receiving said caps. The sides of the cooling chamber 36a are perforated with holes 104 and in addition are provided with circular openings 105 covered by screens 106. The cooling fins are not necessary with this construction.

In the front of the cabinet and near the cooling chamber is located blower 107 operated by motor 107a and having air intake 108 and 108a and outlet 109. This outlet is directly opposite one of the circular openings 105 and is designed to throw a strong current of air against the coffee in the cooling chamber, the force of the air blowing most of the free chaff from the coffee out the other openings 105 into the lower part of the compartment 110. In this construction there is also provided a partition 111 which completely separates the cabinet into upper and lower compartments, the upper compartment 112 containing the roasting chamber and the lower compartment 110 containing the cooling chamber. Because of this partition none of the chaff, etc. blown from the cooling chamber will be blown into the upper compartment 112. It will be noted that some of the air from the blower 107 is taken from the upper compartment 112 through intake 108. This removes the warm moist air from the roasting chamber which enters this compartment through openings 32. Most of the air, however, is taken through inlet 108a from the cooler air outside the cabinet.

The mechanism for the door 35 of the roasting chamber 24 operates in exactly the same manner as in the mechanism described in the previous figures except that the handle 37 thereof depresses two switches 38 and 113 respectively. Switch 38 might be made double acting and switch 113 dispensed with. By depressing switch 38 the heater and green light are turned off as in the previous disclosure. By depressing switch 113 an added mechanism is set in operation in the following manner. In the bottom of the cabinet is located timer 114, which is controlled by switch 113 and which operates the door 41a of the cooling chamber automatically by means of solenoid 115. The switch 113 closes the circuit to solenoid 115 and to the timer which latter operates for a given period, such as 15 minutes, and at the end of which time it opens the circuit to solenoid 115 which is de-energized causing sliding door 41a to open because of weight W and the impeller 40 in the cooling chamber discharges the coffee through the door opening into bin 116 which is manually movable from the cabinet by means of handle 117. In the bottom of this construction is located another blower 118 operated by motor 119 designed to withdraw the free chaff, fumes, etc., from the cabinet through opening 120 to a pipe (not shown) for ultimate disposal.

It is to be understood that the timer 114, shown in this construction, may be replaced by another construction such as a thermostat to control this door opening mechanism.

In the construction shown in Fig. 11, the locking and operation initiating member is slightly different from that shown in the other disclosures. This is brought out in Fig. 12 in which the locking and operation initiating member 17b is shown having lateral flanges 18a in the front thereof instead of the vertically extending flange 18 in the rear as in the other disclosures. The member 17b is movable by the cap on the green coffee container to unlock the device as previously described. When the carriage 6 is withdrawn from the hood these flanges 18a are contacted by depending lugs 121 on the bottom of the carriage which draw the member with the carriage to lock the device by sealing the port 16. It is understood that other and different locking and operation initiating means may be provided for our device without departing from the spirit of our invention.

The electrical circuits and contacts diagram for the construction shown in Fig. 11 is shown in Fig. 13. As will be seen from the diagram the wiring is much the same as in Fig. 10. The initiating switch closes the circuit to relays one and two. Relay No. 1 closes the circuit to the fan and motor (which are in parallel) starting them in operation. Relay No. 2 closes the circuit to the heater and green light. The thermostat is adapted to close the circuit to the red light and solenoid 34 which operates the door opening mechanism and the handle 37 which latter depresses switch 38 to open the circuit to the heater and green light. The handle 37 also depresses switch 113 to close the circuit to the timer 114 and relay #3 through wires 209, 209a and 209b. Relay #3 is energized to close contact 210 which closes the circuit through wires 211, 211a to the solenoid 115, which closes door 41a.

The timer operates to de-energize relay No. 3 which opens the circuit to solenoid 115 to open the door 41a of the cooling chamber which is normally open. The stop switch 44 may be operated to open all the circuits at any time as shown.

While we have herein disclosed an illustrative embodiment of the invention it is to be understood that the invention is not limited thereto but comprehends other structures, details, arrangements of parts, features and the like without departing from the spirit of the invention. We reserve our right to hereafter claim, either in this or a separate application, all patentable features herein disclosed but not heretofore claimed.

Having thus disclosed the invention, we claim:

1. In combination with a coffee roaster having a port for receiving green coffee, and a container of green coffee therefor, said container having a cap thereon, a carriage on said roaster, means on said carriage for holding said container, said holding means being so constructed and arranged that the cap of said container extends beyond said means, a movable covering for said port, and means for severing said cap from said container, said cap being adapted to move said covering to open said port.

2. In combination, a coffee roaster having a port in the top thereof, a movable cover for said port, a green-coffee container, a cap on said container, means on said cap for moving said cover to open said port, a movable carriage on said roaster and adapted to hold said container, and means for severing said cap from said container.

3. In combination an electric coffee roaster, having a port and a covering therefor, a coffee container, a carriage on said roaster for holding said container, means on said container for opening said port upon movement of said carriage, a switch on said roaster for turning on the electric current thereto, and means on said carriage for operating said switch.

4. In a coffee roaster the combination of a roasting chamber having an intake and a cover therefor, feeding mechanism for said chamber, said feeding mechanism being adapted to receive and operate only with a container supply of a predetermined capacity so as to insure against overloading said roasting chamber, said mechanism comprising a carriage adapted to receive said container, means for making an opening in said container, and means operated by said container and carriage to remove the cover from said chamber intake to receive the coffee through said opening.

5. In a coffee roaster, a roasting chamber having a coffee intake, a green coffee container having a predetermined cap, a carriage adapted to receive said container, a movable covering for said intake and so positioned with respect to said carriage that when the carriage and container are moved toward said intake the cap will move the covering to open the intake for passage of the green coffee therethrough to said chamber, and means for severing said cap.

6. In a coffee roaster, a roasting chamber having an intake port, a closure for said port normally in locked closing position, a predetermined key member carried by said closure, and a green coffee container provided with a predetermined key member adapted to lock with said first mentioned key member for permitting the movement of said closure to open the intake port for charging said chamber with a batch of coffee.

7. In a coffee roaster, a roasting chamber having an intake port, a closure for said port, a green coffee container having a cap, means for feeding the coffee to the roaster comprising a carriage for receiving the container and carrying it to said port, means on said cap for moving said closure to open said port, means for shearing said cap and means on said carriage to move said closure to close said port.

8. In combination with the roasting chamber of a coffee roaster, an impeller for uniformly agitating the coffee in said chamber comprising a plurality of rotatable blades having one edge adjacent the floor of said chamber, said blades extending rearwardly and upwardly at an angle of about 55° to said floor with respect to the direction of travel.

9. In a coffee roaster, a roasting chamber having an intake port, a loading carriage, and a flanged plate adapted to be moved by said carriage to open and close said port.

10. In a coffee roaster, a roasting chamber having an intake port, a loading carriage having flanges, and a closure plate having flanges and adapted to be moved by said carriage to open said port, said flanges being adapted to interengage whereby said plate may be moved by said carriage to close said port.

11. In a coffee roaster provided with a roasting chamber having a port therein, a loading mechanism therefor comprising a predetermined container, spaced rails on said chamber, a carriage slidable on said rails toward and away from said port and having a compartment to receive said container, and a cover for said port and slidably positioned below said rails, said cover being movable by said container to open said port and having means cooperating with said carriage whereby when said carriage is moved away from said port it will move said cover to close said port.

12. In combination in a coffee roaster, a roasting chamber having a metallic bottom, an electrical heating element within the metal of said bottom, a circuit including the heating element, a switch in the circuit, a charging port in the roasting chamber, a movable closure for the port, a carriage on the roaster, a separate coffee container removably inserted in the carriage, said container having a discharge portion, the carriage and container being movable to bring the discharge portion of the container over the port, means on the roaster to open the bottom of the container as it moves with the carriage into position over the port to discharge its contents into the roasting chamber, the container having a portion operating to open the port closure during said movement, and means on the carriage for closing said switch when the container is in discharging position over the port to initiate the heating of the roasting chamber.

13. In combination in a coffee roaster, a frame having a roasting chamber and a cooling chamber therein, the cooling chamber being adjacent and below the roasting chamber and immediately therebelow, the roasting chamber having a metallic bottom, an electrical heating element within the metal of said bottom, a driving shaft extending through the cooling chamber and into the roasting chamber, a multi-bladed impeller in each of said chambers, each of said impellers being fixed to rotate with the shaft, the lower edge of each impeller blade being closely adjacent the bottom of its chamber, the front face being inclined upwardly and rearwardly and the overall diameter of each impeller being slightly less than the inside diameter of its chamber, means for rotating said impellers with such rapidity as to cause the coffee beans in the chamber being operated upon to be rapidly moved in devious gyratory paths around the interior of the chamber to be more readily and thoroughly susceptible to the temperature change in the chamber, and means operated by the heat in the roasting chamber for deenergizing the heating element and discharging the contents of the roasting chamber into the cooling chamber when the temperature of the coffee beans in the roasting chamber reaches a predetermined degree.

14. In combination in a coffee roaster, a roasting chamber having a charging port, a carriage movable over and away from said port, a filled green coffee container removably inserted in the carriage to move therewith to and from position over the port, and a cutter on the roaster to cut open a part of the bottom of the container during its movement to position over the port whereby to discharge the green coffee beans within the container into the roasting chamber.

15. In combination in a coffee roaster, a roasting chamber having a charging port, a carriage movable laterally over the top of the roaster to and from position over the charging port, a filled green coffee container removably inserted in the carriage to move therewith to and from the charging port, and means on the roaster engaging the container to open the bottom of the same during its movement so that the green coffee in the container will be charged into the roasting chamber when the opened container arrives over the port.

16. In combination in a coffee roaster, a roasting chamber having a charging port, a carriage movable laterally over the top of the roaster to and from position over the charging port, a filled green coffee container removably inserted in the carriage to move therewith to and from the charging port, and means on the roaster engaging the container to open the bottom of the same during its movement so that the green coffee in the container will be charged into the roasting chamber when the opened container arrives over the port, a heater for the roasting chamber, a control for said heater, and means on the carriage for operating said control to initiate operation of the heater when the carriage moves into charging position over the charging port.

17. In combination in a coffee roaster, a roasting chamber having a charging port, a carriage movable laterally over the top of the roaster to and from position over the charging port, a filled green coffee container removably inserted in the carriage to move therewith to and from the charging port, and means on the roaster engaging the container to open the bottom of the same during its movement so that the green coffee in the container will be charged into the roasting chamber when the opened container arrives over the port, a closure for said port, and means operated by the carriage and container for opening and closing said closure.

18. In combination in a coffee roaster, a roasting chamber having a charging port, a carriage movable laterally into position over, and away from said port, said carriage being adapted to removably receive a green coffee container and move the same to and from position over the port, and means on the roaster adjacent the path of movement of the carriage engaging the container to open the bottom of the same during its movement whereby the green coffee in the container may be charged into the roasting chamber when the opened container arrives over the port, the carriage being movable away from said port to position to receive another container.

19. In combination in a coffee roaster, a roasting chamber having a charging port, a carriage movable laterally into position over, and away from said port, said carriage being adapted to removably receive a green coffee container and move the same to and from position over the port, and means on the roaster adjacent the path of movement of the carriage engaging the container to open the bottom of the same during its movement whereby the green coffee in the container may be charged into the roasting chamber when the opened container arrives over the port, the carriage being movable away from said port to position to receive another container, a heater for the roasting chamber, a control for said heater, and means on the carriage for operating the control to start operation of the heater when the carriage moves into charging position over the charging port.

20. In combination in a coffee roaster, a roasting chamber having a charging port, a carriage movable laterally into position over, and away from said port, said carriage being adapted to removably receive a green coffee container and move the same to and from position over the port, and means on the roaster adjacent the path of movement of the carriage engaging the container to open the bottom of the same during its movement whereby the green coffee in the container may be charged into the roasting chamber when the opened container arrives over the port, the carriage being movable away from said port to position to receive another container, a closure for said port and means operated by the carriage and container for opening and closing said closure.

DONALD W. ADAMS.
RICHARD L. SCHUHMANN.

CERTIFICATE OF CORRECTION.

Patent No. 2,185,878.

January 2, 1940.

DONALD W. ADAMS, ET AL.

It is hereby certified that error appears in the printed specification of the above numbered patent requiring correction as follows: Page 1, first column, line 28, for the word "contents" read content; page 3, second column, line 28, for "an" read and; page 6, second column, lines 60 and 61, claim 13, strike out the words "and immediately therebelow"; and that the said Letters Patent should be read with this correction therein that the same may conform to the record of the case in the Patent Office.

Signed and sealed this 5th day of March, A. D. 1940.

(Seal)

Henry Van Arsdale,
Acting Commissioner of Patents.